(12) United States Patent
Yoshikawa

(10) Patent No.: US 9,387,562 B2
(45) Date of Patent: Jul. 12, 2016

(54) DEVICE AND METHOD FOR ASSEMBLING WRITING HEAD UNIT

(71) Applicant: Hiroshi Yoshikawa, Tokyo (JP)

(72) Inventor: Hiroshi Yoshikawa, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/602,375

(22) Filed: Jan. 22, 2015

(65) Prior Publication Data

US 2015/0209922 A1 Jul. 30, 2015

(30) Foreign Application Priority Data

Jan. 28, 2014 (JP) .................. 2014-013567
Oct. 31, 2014 (JP) .................. 2014-222814

(51) Int. Cl.
| | |
|---|---|
| *B41J 2/21* | (2006.01) |
| *B23P 19/10* | (2006.01) |
| *B41J 29/02* | (2006.01) |
| *B41J 29/393* | (2006.01) |

(52) U.S. Cl.
CPC ............ *B23P 19/10* (2013.01); *B41J 29/02* (2013.01); *B41J 29/393* (2013.01); *Y10T 29/49401* (2015.01); *Y10T 29/53087* (2015.01)

(58) Field of Classification Search
CPC .................. B41J 29/393; B41J 2/14233
USPC ....................... 347/50; 29/759, 890.1
See application file for complete search history.

(56) References Cited

U.S. PATENT DOCUMENTS

| | | | |
|---|---|---|---|
| 8,069,564 B2 * | 12/2011 | Yanagisawa | B41J 29/393 29/759 |
| 2002/0043611 A1 | 4/2002 | Yoshikawa et al. | |
| 2005/0001881 A1 * | 1/2005 | Nakashima | B41J 2/14233 347/50 |
| 2009/0267975 A1 | 10/2009 | White et al. | |

FOREIGN PATENT DOCUMENTS

| | | |
|---|---|---|
| CN | 1916736 | 2/2007 |
| CN | 101407131 | 4/2009 |
| JP | 2003-127392 | 5/2003 |
| JP | 2010-058359 | 3/2010 |
| JP | 2010-264715 | 11/2010 |
| JP | 2012-254611 | 12/2012 |

OTHER PUBLICATIONS

Chinese official action dated Dec. 29, 2015 in corresponding Chinese Patent Application No. 201510042014.4.

* cited by examiner

*Primary Examiner* — Lam Nguyen
(74) *Attorney, Agent, or Firm* — Cooper & Dunham LLP

(57) ABSTRACT

An assembly device for a writing head unit includes a head holder; a writing head; an imaging unit to image the writing head temporarily mounted on the head holder; an adjuster to adjust relative positions of the head holder and the writing head using the image of the writing head imaged by the imaging unit; and an optical unit to focus images of reference marks indicating a reference position of the writing head disposed in a direction different from the writing head, and the writing head on the same viewing field. The adjuster adjusts the writing head using the images of the writing head and the reference marks imaged simultaneously by the imaging unit.

13 Claims, 11 Drawing Sheets

DEVICE AND METHOD FOR ASSEMBLING WRITING HEAD UNIT

CROSS-REFERENCE TO RELATED APPLICATIONS

The present application claims priority pursuant to 35 U.S.C. §119(a) from Japanese patent application numbers 2014-013567 and 2014-222814, filed on Jan. 28, 2014, and Oct. 31, 2014, respectively, the entire disclosures of which are incorporated by reference herein.

BACKGROUND

1. Technical Field

Exemplary embodiments of the present invention relate to an assembly device to mount a plurality of writing heads on a head holder and an assembly method thereof.

2. Background Art

Conventionally, for the purpose of obtaining a longer, denser writing head unit, a writing head unit including a plurality of writing heads disposed in one head holder is known. This type of writing head unit has the advantage that it can be produced inexpensively compared to producing a single long, dense writing head.

A writing head unit configured such that a plurality of ink droplet discharge heads each discharging droplets is mounted to the head holder is known. In such an arrangement, the plurality of droplet discharge heads needs to be positioned precisely at respective predetermined positions of the head holder and securely mounted so that the ink droplets are discharged accurately from each of the droplet discharge heads.

Conventionally, an assembly device is known in which a plurality of droplet discharge heads is positioned on a carriage that serves as a head holder and is fixedly mounted thereon. This assembly device includes a movable table on which the carriage on which the plurality of droplet discharge heads is temporarily mounted, an imaging means to take an image of the positions of the carriage and the droplet discharge heads, fine adjustment means to move the droplet discharge heads, and a fixing processor to secure the droplet discharge heads to the carriage. In this type of assembly device, first, an alignment mask formed by patterning a reference position mark of the carriage and a reference position mark of each droplet discharge head is set on the movable table. Then, the table is moved, the reference position mark of the carriage and the reference position marks of each of the droplet discharge heads formed on the alignment mask are sequentially imaged by the imaging means, and the imaged data is stored as master position data.

Next, the alignment mask is removed from the table of the assembly device, and the carriage on which the plurality of droplet discharge heads is actually, temporarily mounted is set on the table. Then, the table is moved, the imaging means images the position of the carriage to obtain the positional data of the carriage, and the obtained positional data is compared with the master position data to position the carriage. Then, the table is moved, one of the plurality of droplet discharge heads temporarily mounted on the carriage is imaged by the imaging means, so that the positional data of the droplet discharge head is obtained. Based on the obtained droplet discharge head positional data and the master position data, the position of the droplet discharge head relative to the carriage is minutely moved by the fine adjustment means to position the droplet discharge head, and the droplet discharge head is fixedly mounted to the carriage by the fixing processor. The positioning and securing processes are sequentially performed for all the droplet discharge heads temporarily mounted on the carriage, so that each droplet discharge bead is mounted to its corresponding, predetermined position of the carriage.

SUMMARY

In one embodiment of the disclosure, there is provided an improved assembly device for a writing head unit including a head holder; a writing head; an imaging unit to image the writing head temporarily mounted on the head holder; an adjuster to adjust relative positions of the head holder and the writing head using the image of the writing head imaged by the imaging unit; and an optical unit to focus images of reference marks indicating a reference position of the writing head disposed in a direction different from the writing head, and the writing head on the same viewing field. The adjuster adjusts the writing head using the images of the writing head and the reference marks imaged simultaneously by the imaging unit.

In another embodiment of the disclosure, there is provided an assembly method for a writing head unit including mounting a writing head temporarily on a head holder; imaging with an imaging unit the writing head temporarily mounted on the head holder by simultaneously imaging, on the same viewing field, reference marks indicating reference positions of the writing head disposed in a direction different from the writing head and the writing head are simultaneously imaged on the same viewing field; and adjusting with an adjuster relative positions of a plurality of writing heads and the head holder using obtained images of the writing head based on the simultaneous images of the writing head and the reference marks.

These and other objects, features, and advantages of the present invention will become apparent upon consideration of the following description of the preferred embodiments of the present invention when taken in conjunction with the accompanying drawings.

BRIEF DESCRIPTION OF THE DRAWINGS

FIGS. 2A and 2B are schematic views of the droplet discharge head, of which FIG. 2A is a perspective view and FIG. 2B is a plan view seen from a nozzle plate;

DETAILED DESCRIPTION

A droplet discharge head unit including droplet discharge heads for use in an inkjet recording apparatus is described below. The droplet discharge head unit is an example of a writing head unit to be assembled using an assembly device according to an embodiment of the present invention.

First, a droplet discharge head 23 as a writing head will be described. The liquid discharged by the droplet discharge head 23 is not limited to so-called ink, but means and is used as an inclusive term for all types of liquids including DNA samples, and resist and pattern materials.

Figure 1:
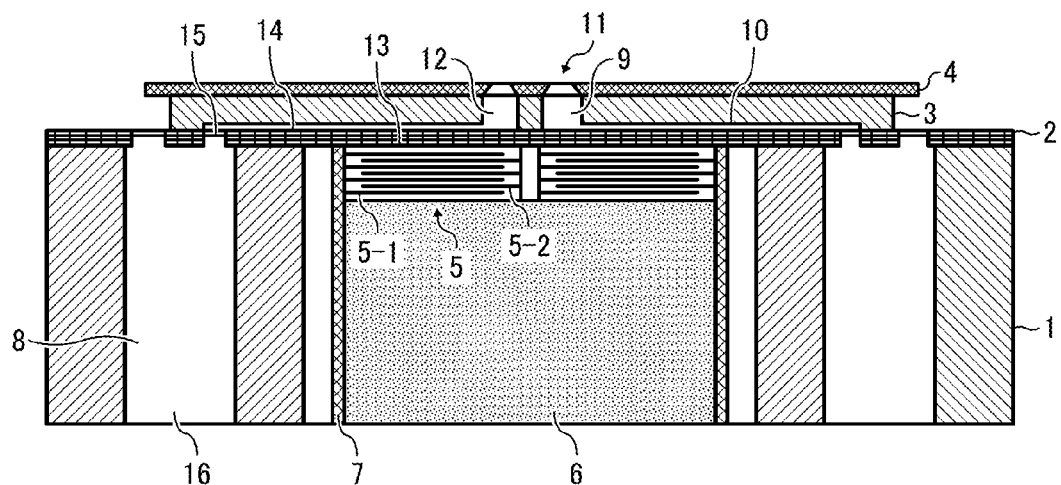
FIG. 1 is an enlarged cross-sectional view of a droplet discharge head illustrating a main part in a direction between channels according to an embodiment of the present invention.

FIG. 1 is an enlarged cross-sectional view of a droplet discharge head illustrating a main part in a direction between channels according to an embodiment of the present invention. As illustrated in FIG. 1, a discharge portion of the droplet discharge head 23 includes a frame member 1, a vibration plate 2, a channel plate 3, a nozzle plate 4, a layered piezoelectric element 5, and a piezoelectric zirconate titanate (PZT) base 6. The frame member 1 includes cavities that are used as an ink supply port 16 and a common liquid chamber 8. The vibration plate 2 includes a convex part 13, a diaphragm 14, and an ink inlet 15. The channel plate 3 includes cavities that are used as a pressure chamber 9 and a fluid resistor 10, and a through-hole 12 communicating to a nozzle hole 11. The nozzle hole 11 is formed on the nozzle plate 4. The layered piezoelectric element 5 is joined to the vibration plate 2 via an adhesive layer. The layered piezoelectric element 5 is fixedly mounted to the PZT base 6.

The PZT base 6 is formed of a barium titanate ceramic material and includes two rows of layered piezoelectric element 5 laminated each other. The layered piezoelectric element 5 includes a piezoelectric layer formed of lead zirconate titanate (PZT) having a thickness of from 10 to 50 [μ/layer] and an internal electrode layer formed of silver-palladium (AgPd) having a thickness of several micrometers that are alternately layered. The internal electrode is connected with an external electrode at both lateral ends. The layered piezoelectric element 5 is divided into a dentiform shape by a half-cut dicing process and is used as a drive part and a non-drive support part alternately. The exterior of the external electrode is cut to a prescribed length so as to be divided by the half-cut dicing process, and used as a plurality of individual electrodes. The other side of the external electrode is not divided by the dicing process and is used as a common electrode. A flexible printed circuit (FPC) 7 is attached by soldering to the individual electrodes of the driver section. In addition, the common electrode joins a ground electrode 5-1 of the FPC 7 via an electrode layer disposed at an end of the layered piezoelectric element 5. The FPC 7 is embedded with a driver IC and controls a supply of the drive voltage to the driver section.

The vibration plate 2 includes the thin-film-shaped diaphragm 14, island-shaped convex part 13, a thick film portion including a beam that connects with a support portion, and the ink inlet 15. The ink inlet 15 is formed by electro-casting and includes double layers of Ni-coated film. The island-shaped convex part 13 joins the layered piezoelectric element 5 as a driver section formed in the center of the diaphragm 14. The diaphragm 14 has a thickness of 3 [μm], and a width of 35 [μm] per each side. Joints between the island-shaped convex part 13 of the vibration plate 2 and a movable portion 5-2 of the layered piezoelectric element 5, and between the vibration plate 2 and the frame member 1 will be described later in detail. Briefly, an adhesive layer including a gap material is subject to patterning and is used.

As described above, the channel plate 3 employs a monocrystalline silicon substrate, and includes the pressure chamber 9 and the fluid resistor 10, and the through-hole 12 communicating to the nozzle hole 11 that are formed by patterning using etching method. More specifically, the channel plate 3 is formed such that the monocrystalline silicon substrate is subjected to anisotropic etching using alkali etching aqueous fluid such as potassium hydroxide aqueous solution (KOH). A portion left after etching becomes a separation wall of the pressure chamber 9. In addition, the head according to the present embodiment includes a portion having a narrower etching width, which is made the fluid resistor 10.

The nozzle plate 4 is formed of metallic materials such as Ni-coated film by electro-casting, and includes many nozzle holes 11, each of which is a minute discharge opening to jet ink droplets therefrom. An interior of the nozzle hole 11 has a horn shape, but may be substantially a cylinder shape or a conical trapezoidal shape. In addition, a diameter of the nozzle hole 11 is approximately 15 to 30 [μm] at an end of the opening from which ink droplets are jetted. In addition, a nozzle pitch of each row of nozzles is 150 or 300 [dpi]. An ink discharge surface or a nozzle surface of the nozzle plate 4 includes a waterproof layer subjected to a water-repellent surface treatment. A water-repellent treatment film selected in accordance with each physical property of the ink is provided by, for example, PTFE-Ni codeposit coating or electrodeposition coating of fluorine resins; vapor deposition coating of evaporable fluorine resins such as pitch fluoride; and coating solvent such as silicon resins or fluorine resins and then baking. By an appropriate selection, a shape of the ink droplet and jetting property are stabilized, thereby obtaining a high quality image.

The frame member 1 that includes cavities for the ink supply port 16 and the common liquid chamber 8 is formed of resins. A portion around the ink inlet 15 of the vibration plate 2 is sealed by an adhesive coated on the frame member 1 without any gap. The common liquid chamber 8 to supply ink to each pressure chamber 9 is formed on the frame member 1. The ink liquid passes from the common liquid chamber 8 to the ink inlet 15 formed on the vibration plate 2, a channel formed upstream of the fluid resistor 10, and the fluid resistor 10, and is supplied to the pressure chamber 9. The frame member 1 includes the ink supply port 16 to supply ink from an external source to the common liquid chamber 8. In addition, the common liquid chamber 8 has a rectangular shape in a plan view along the pressure chamber 9 and the nozzle arrays.

A drive waveform, being a pulse voltage of 10 to 50 volts, is applied to the driver section of the thus-configured droplet discharge head 23. Displacement in the layer direction is energized to the driver section, the pressure chamber 9 is pressurized via the vibration plate 2, so that the pressure increases, and an ink droplet is discharged from the nozzle hole 11. Thereafter, upon the end of the ink droplet discharge, the pressure inside the pressure chamber 9 decreases, and a negative pressure is generated inside the pressure chamber 9 due to an inertial force of the ink flow and a discharging process of the driving pulse voltage, so that ink refills the chamber 9. The ink supplied from the ink tank flows to the common liquid chamber 8, passes from the common liquid chamber 8 to the ink inlet 15 and further to the fluid resistor 10, and is filled in the pressure chamber 9. The fluid resistor 10 attenuates the residual pressing vibration after the ink droplet discharge, which at the same time becomes resistance to refilling by a surface tension. By appropriately selecting the material for the fluid resistor 10, attenuation of the residual pressure and refilling time are balanced, thereby shortening a drive cycle to proceed to a next ink droplet discharge operation.

In the present embodiment, at least part of the liquid chamber of the ink discharge portion of the droplet discharge head 23, the fluid resistor, the vibration plate, and the nozzle portion is preferably formed of a material including one of silicon and nickel. In addition, although in the present embodiment a layered piezoelectric element is used as a drive actuator, alternatively a thin-layer piezoelectric element can be used as an actuator.

Figure 2A:
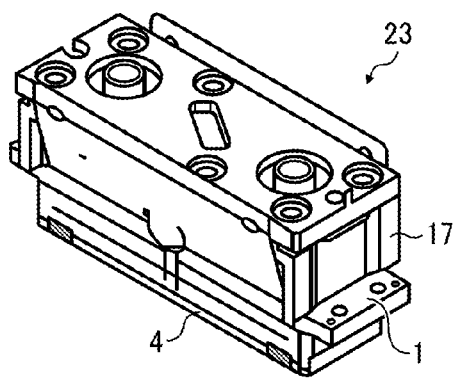
Figure 2B:
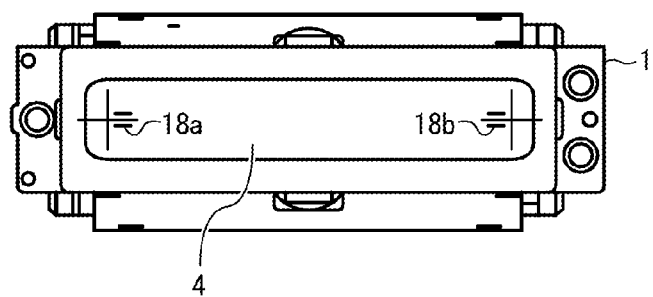

FIGS. 2A and 2B are schematic views of the droplet discharge head, of which FIG. 2A is a perspective view and FIG. 2B is a plan view seen from the nozzle plate. The droplet discharge head 23 includes a head case 17 mounted on the frame member 1 as illustrated in FIG. 1. The nozzle plate 4, a writing surface of the droplet discharge head 23, includes nozzle alignment marks 18a, 18b, which are used to position the droplet discharge head 23 on a head unit base 21 (see FIG. 4). (It is noted that the nozzle alignment mark 18 may be described in a singular form inclusively for simplification.)

Figure 3:
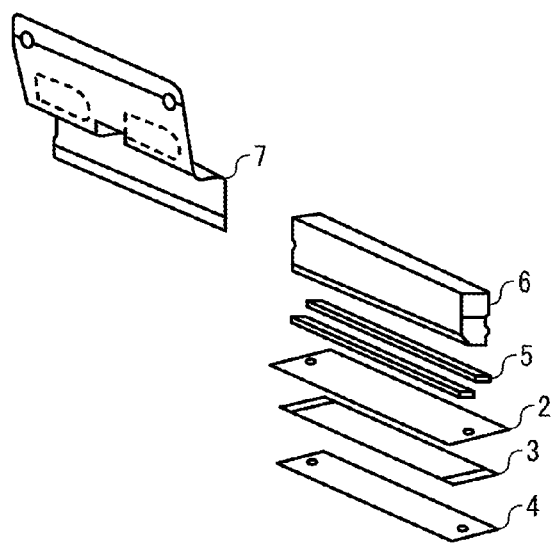
FIG. 3 is an exploded perspective view of the droplet discharge head according to an embodiment of the present invention.

FIG. 3 is an exploded perspective view of the droplet discharge head according to an embodiment of the present invention. As illustrated in FIG. 3, the nozzle plate 4, the channel plate 3, the vibration plate 2, the layered piezoelectric element 5, the PZT base 6, and the FPC 7 are laminated with an adhesive, on which the frame member 1 and the head case 17 are mounted and the droplet discharge head 23 is thus assembled.

More specifically, the droplet discharge head 23 is assembled as follows. In a first process, the channel plate 3 and the vibration plate 2 are laminated and joined together. In a second process, the layered piezoelectric element 5 and the PZT base 6 are joined together with an adhesive. In a third process, the combined channel plate 3 and the vibration plate 2 are joined the nozzle plate 4. In a fourth process, the combined layered piezoelectric element 5 and the PZT base 6 and the FPC 7 are joined together by soldering. In a fifth process, the combined channel plate 3, the vibration plate 2, and the nozzle plate 4 are laminated with the combined layered piezoelectric element 5, the PZT base 6, and the FPC 7. Further, in a sixth process, the frame member 1 and the head case 17 are joined together.

In the inkjet recording apparatus, a longer droplet discharge head with a high density is desirable due to a need for higher speed and higher definition. However, producing a longer droplet discharge head with a high-definition is difficult and drastically increases production costs. By contrast, a plurality of droplet discharge heads each comparatively small and easier to be produced may be connected to each other to form an integrated droplet discharge head unit. In this case, the cost rise can be restricted. As an exemplary droplet discharge head unit, the one in which the droplet discharge heads are disposed in a staggered manner, or the other in which the droplet discharge heads are connected along the nozzle row direction are known.

The droplet discharge head unit according to an embodiment of the present invention is formed such that a plurality of droplet discharge heads 23 is mounted on the head unit base 21 as a head holder.

Figure 4:
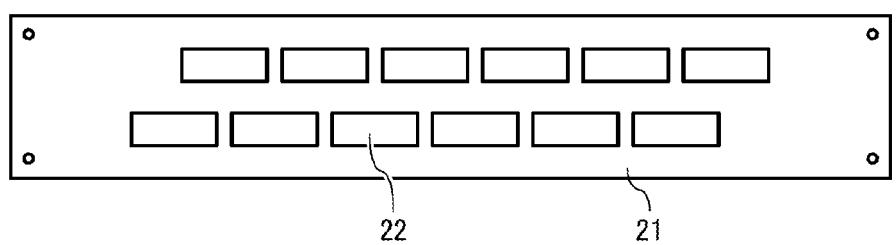
FIG. 4 is a plan view of a head unit base according to an embodiment of the present invention.

FIG. 4 is a plan view of a head unit base according to an embodiment of the present invention. The head unit base 21 includes a plurality of engagement holes 22 with which the plurality of droplet discharge heads 23 is engaged. Each droplet discharge head 23 is positioned and fixedly mounted to the head unit base 21 sequentially using assembly device, to be described later, and mounted as a whole.

When the head unit base 21 is set on the assembly device, each of the droplet discharge heads 23 is inserted into each engagement hole 22 and is mounted temporarily, allowing a slight positional adjustment via the frame member 1. More specifically, as illustrated in FIG. 2A, the frame member 1 includes a flange that extends outward. The droplet discharge head 23 is placed on the head unit base 21 via the flange of the frame member 1. The nozzle plate 4, a writing surface of the droplet discharge head 23, is disposed facing downward and the nozzle alignment marks 18a, 18b, are observed from below. After a positional alignment by a method, to be described later, the droplet discharge head 23 is joined the head unit base 21 via the flange of the frame member 1.

The droplet discharge head 23 or the frame member 1 and the head unit base 21 can be joined with an adhesive, screws, or by spot welding. In the assembly device to be described later, UV exposure device is used as a curing process unit 35 (see FIG. 6). A UV adhesive is coated on the head unit base 21 in advance, the head unit base 21 is irradiated with UV light, and the flange of the frame member 1 contactlessly to cause the irradiated part to be cured and fixed. The UV exposure device as the curing process unit 35 is securely disposed on a chassis base 45 (see FIG. 7).

The droplet discharge head unit configured such that the plurality of droplet discharge heads 23 is mounted on the head unit base 21 is mounted to the body of the image forming apparatus such as the inkjet recording apparatus.

Figure 5:
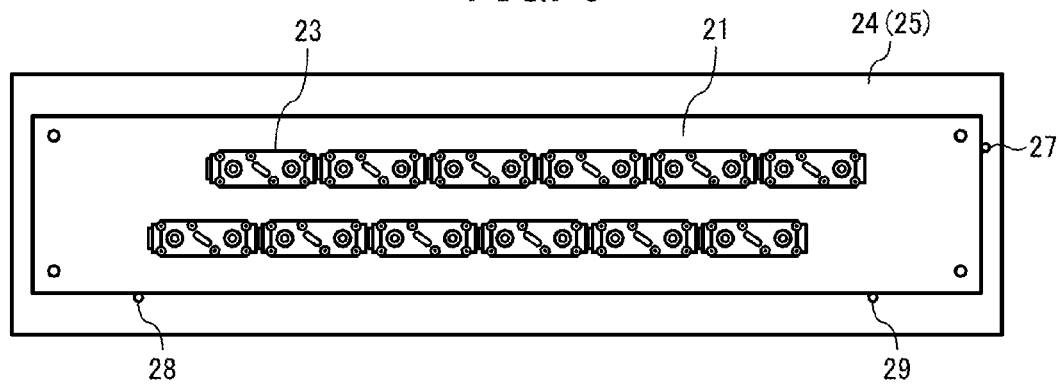
FIG. 5 is a schematic view illustrating an example of mounting the droplet discharge head to a body of an image forming apparatus.

FIG. 5 is a schematic view illustrating an example of mounting the droplet discharge head to the body of the image forming apparatus. As illustrated in FIG. 5, a base 24 of the apparatus body includes three reference pins 27, 28, and 29, to which the head unit base 21 is brought to contact, and then, the head unit base 21 is fastened to the base 24 with bolts. In FIG. 5, twelve droplet discharge heads 23 are disposed laterally (in a longitudinal direction of the base 24) in two rows in a staggered manner on one head unit base 21. Ink droplets are discharged from each droplet discharge head 23 of the head unit to thus form an image on a recording medium moving vertically in an illustrated example of FIG. 5. By increasing a number of head unit base 21 optionally in one inkjet recording apparatus, the number of colors or the number of dots per inch (dpi) can be increased.

In such a droplet discharge head unit, the plurality of droplet discharge heads 23 needs to be aligned accurately at respective predetermined positions of the head unit base 21 and to be fixed so that the ink droplet discharged from each droplet discharge head 23 lands on a target position. What is particularly important is that impacted ink from adjacent heads should be a predetermined distance apart.

Next, an assembly device of the droplet discharge head unit according to an embodiment will be described.

Figure 6:
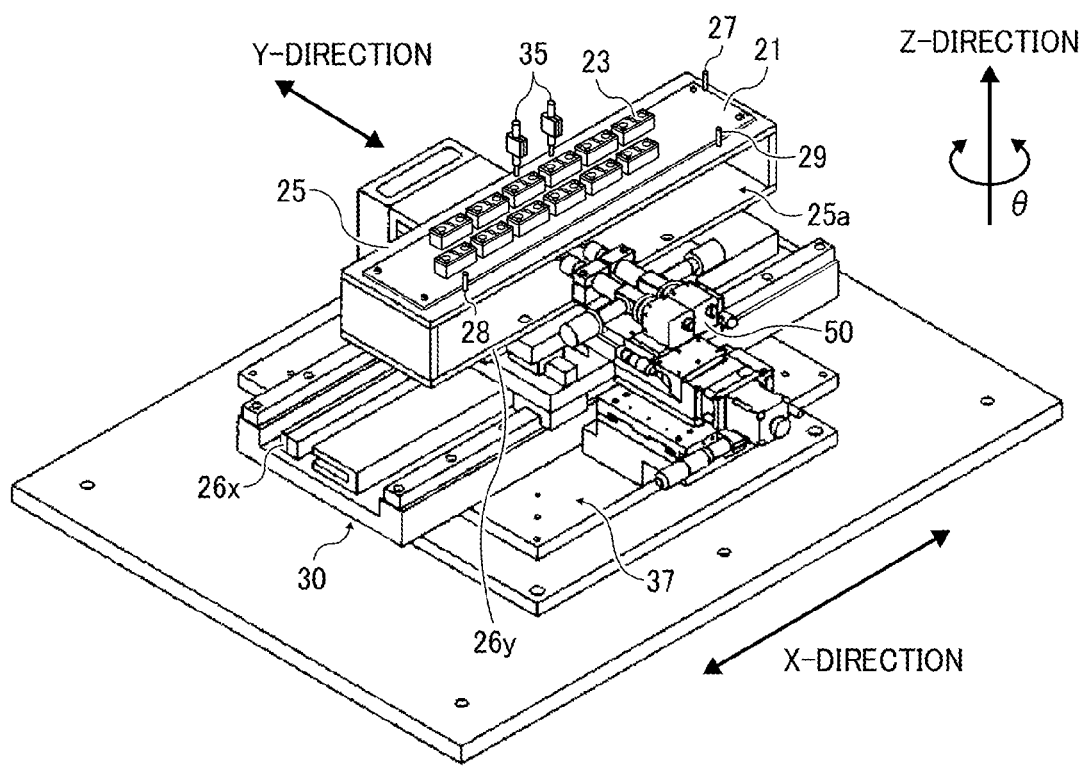
FIG. 6 is a perspective view of a head unit base moving device for an assembly device of the droplet discharge head according to an embodiment of the present invention.

FIG. 6 is a perspective view of a head unit base moving device for the assembly device of the droplet discharge head unit according to an embodiment of the present invention.

The head unit base 21 is fixed on a unit base fixture 25 of the assembly device. The unit base fixture 25 is similarly configured as that of the base 24 of FIG. 5. Specifically, three reference pins 27, 28, and 29 are disposed on the unit base fixture 25. The head unit base 21 is fixed to the unit base fixture 25 with screws in such a manner that an edge in X-direction (see FIG. 6) of the head unit base 21 contacts the reference pin 27 and an edge in Y-direction (see FIG. 6) of the head unit base 21 contacts the reference pins 28 and 29. The X-direction corresponds to a longitudinal direction of the head unit base 21 and the Y-direction corresponds to a short side direction of the head unit base 21.

The unit base fixture 25 is a pedestal having a cavity in the Y-direction that is an optical axis direction of a charge-coupled device (CCD) camera 50, and is fixed on a XY stage 30 serving as a holder moving member. The XY stage 30 is similarly configured as a known, general XY stage, and includes an X-direction movable portion that moves along the X-direction via one linear drive unit 30x (see FIG. 12) and a Y-direction movable portion, fixedly mounted on the X-direction movable portion, that moves along the Y-direction via the other linear drive unit 30y (see FIG. 12). The unit base fixture 25 is fixedly mounted on the Y-direction movable portion of the XY stage 30 and can move the unit base fixture 25 to a target position in both X- and Y-directions by the XY stage 30.

The CCD camera 50 that functions as an imaging device includes an imaging element formed of a CCD. Alternatively, the imaging element may be formed of other imaging device such as CMOS (complementary metal-oxide semiconductor). The CCD camera 50 includes an optical system including imaging lenses, of which a leading end portion positions at a hollow cavity 25a inside the unit base fixture 25. The hollow cavity 25a is open lest the leading portion of the camera should interfere with the unit base fixture 25 in an X-direction movable range of the XY stage 30.

The head unit base 21 moves, via the XY stage 30, to a position at which the plurality of droplet discharge heads 23 is joined with predetermined pitches accurately designed in the X- and Y-directions (that is, with a pitch between adjacent heads in the X-direction and a pitch between adjacent heads in the Y-direction). In this case, the pitch distance is defined by a positioning accuracy of the XY stage 30. As to the X-direction, based on information obtained by a position detector formed of a linear scale 26x and a reading sensor to read the linear scale 26x, the XY stage 30 is controlled to position at a target position accurately. Similarly, as to the Y-direction, the XY stage 30 is positioned at a target position accurately based on the information obtained by a position detector formed of a linear scale 26y and a reading sensor to read the linear scale 26y. In addition, the XY stage 30 is so mounted as to move accurately in the X- and Y-directions, that is, at right angles. In addition, the optical axis direction of the CCD camera and the Y-axis direction are previously adjusted to be accurately parallel to each other.

The XY stage 30 is mounted on an XYθ stage 37 serving as an adjuster. The XYθ stage 37 is similarly configured as a known, general XY stage, and includes an X-direction movable portion that moves along the X-direction via one linear drive unit, a Y-direction movable portion, fixedly mounted on the X-direction movable portion, that moves along the Y-direction via the other linear drive unit, and a θ-direction movable portion via a rotatable drive unit fixedly mounted on the Y-direction movable unit and movable about the Z-axis (θ direction, see FIG. 6) extending in a Z-direction perpendicular to both X- and Y-directions. The XY stage 30 is fixedly mounted on the θ-direction movable portion and can be moved by the XYθ stage 37 to target positions in the X-, and Y-directions and at a target rotary angle in the θ-direction.

Figure 12:
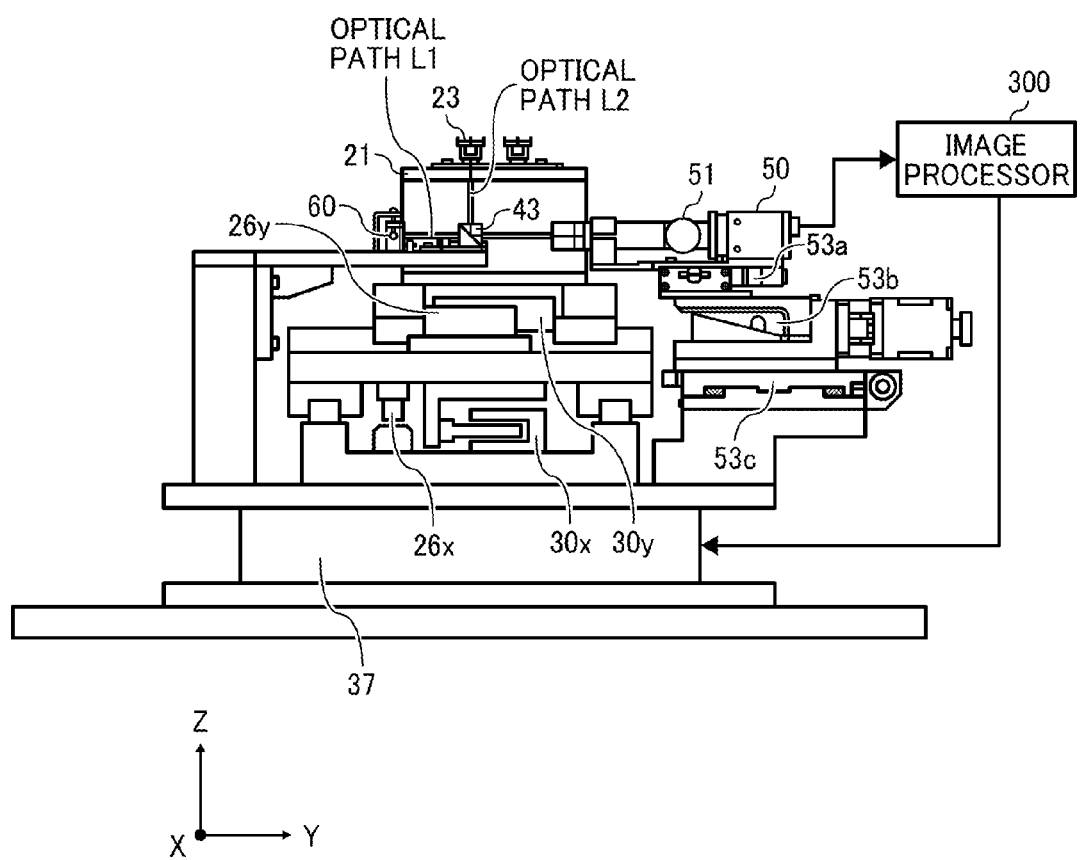
FIG. 12 is a schematic side view illustrating manual triaxial stages for adjusting positions of CCD cameras of the optical detection system.

In addition, the CCD camera 50 is fixed on the XYθ stage 37 via manual triaxial stages 53a, 53b, and 53c (see FIG. 12). Further, a glass chart 60 (see FIG. 10) is fixedly mounted on the XYθ stage 37 via a posture and position adjuster 62 and a glass chart connection block 64.

Thus, because the XY stage 30 is disposed on the XYθ stage 37, an alignment operation using the XYθ stage 37 including an operation to move the XY stage 30 to the X-, and Y-direction target positions and an operation to move the XY stage 30 at a target rotary angle in the θ-direction does not adversely affect a pitch feed operation (i.e., an operation to move the head unit base 21 in the X-, and Y-directions with a predetermined pitch distance) of the head unit base 21 by the XY stage 30. Specifically, a pitch feed accuracy of the head unit base 21 depends on the positioning accuracy of the XY stage 30. In addition, mounting of the droplet discharge head 23 to the head unit base 21 is performed such that the droplet discharge head 23 is fixedly mounted and held by a clamp unit 34 that moves vertically by the pressure stage 36 (see FIG. 10) and the head unit base 21 is aligned by the XYθ stage 37. High mounting accuracy is fixedly mounted due to the positioning accuracy of the XY stage 30 and the alignment accuracy of the XYθ stage 37.

Figure 7:
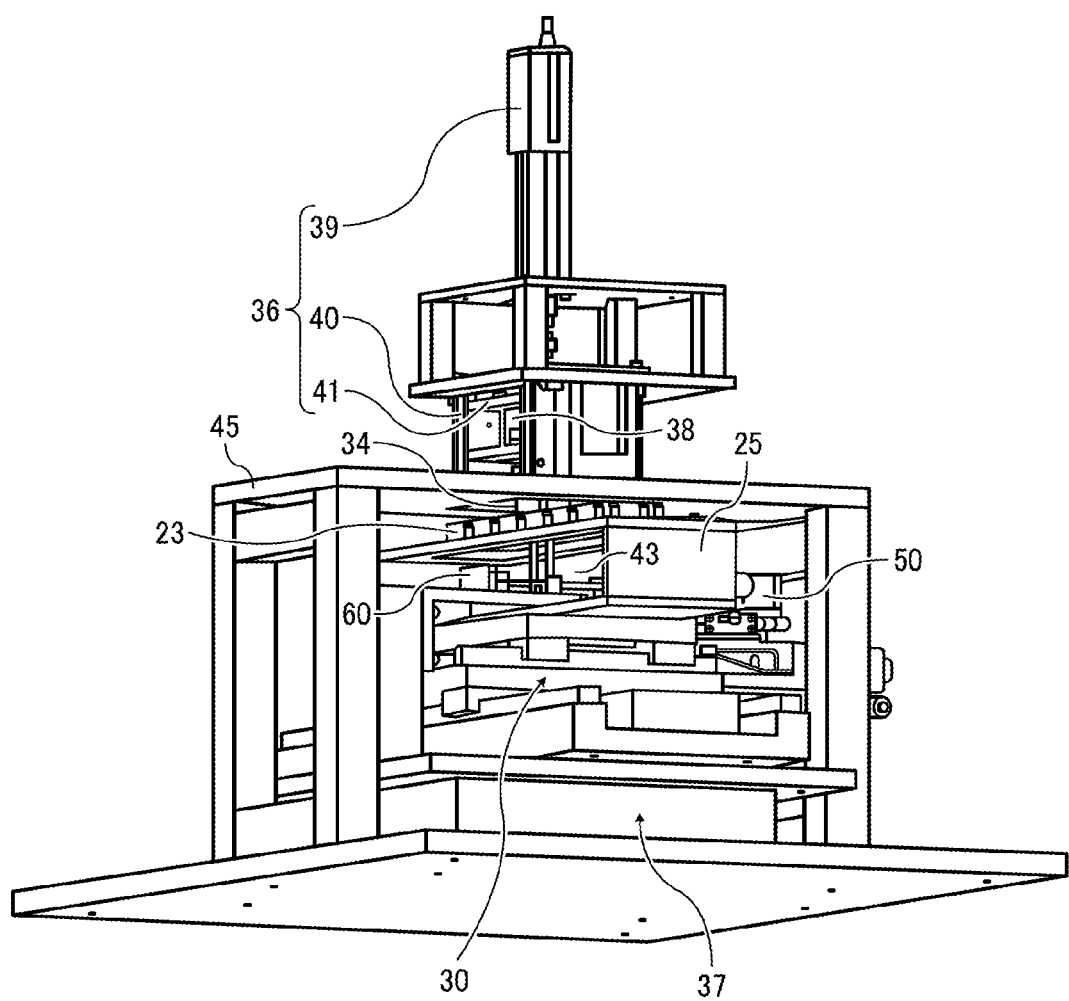
FIG. 7 is a perspective view of the assembly device of the droplet discharge head according to an embodiment of the present invention.

FIG. 7 is a perspective view of the assembly device of the droplet discharge head according to an embodiment of the present invention.

The assembly device according to an embodiment of the present invention includes a function to connect the head unit base 21 with the droplet discharge head 23. As illustrated in FIG. 7, the droplet discharge head 23 mounted temporarily on the head unit base 21 is positioned by the XY stage 30 at a connection position where a UV adhesive adhered on the droplet discharge head 23 is cured by the curing process unit 35, and is held by the clamp unit 34.

The pressure stage 36 moves the clamp unit 34 vertically with the droplet discharge head 23 held by the clamp unit 34. The pressure stage 36 is fixedly mounted on a chassis base 45. The pressure stage 36 includes a pressure actuator 39 that can control a weight, a guide device 40, and a pressure table 41. Specifically, use of an electro-pneumatic actuator as a pressure actuator 39 enables to control a position and a load. The droplet discharge head 23 is slightly spaced away from the head unit base 21 using the pressure stage 36, and the XYθ stage 37 allows the head unit base 21 to be aligned at a predetermined position relative to the droplet discharge head 23. After the alignment has been finished, the pressure stage 36 is used to press the droplet discharge head 23 against the head unit base 21 to complete joining of the droplet discharge head 23 to the head unit base 21 by curing the UV adhesive by the curing process unit 35. In this case, a load can be set arbitrarily by a load control, and in the present embodiment, the load is set at 15 [N].

A joint surface copying device 38 is disposed at a bottom surface of the pressure table 41, the clamp unit 34 is disposed at a bottom surface of the joint surface copying device 38, and the droplet discharge head 23 is securely held to the clamp unit 34.

Figure 8:
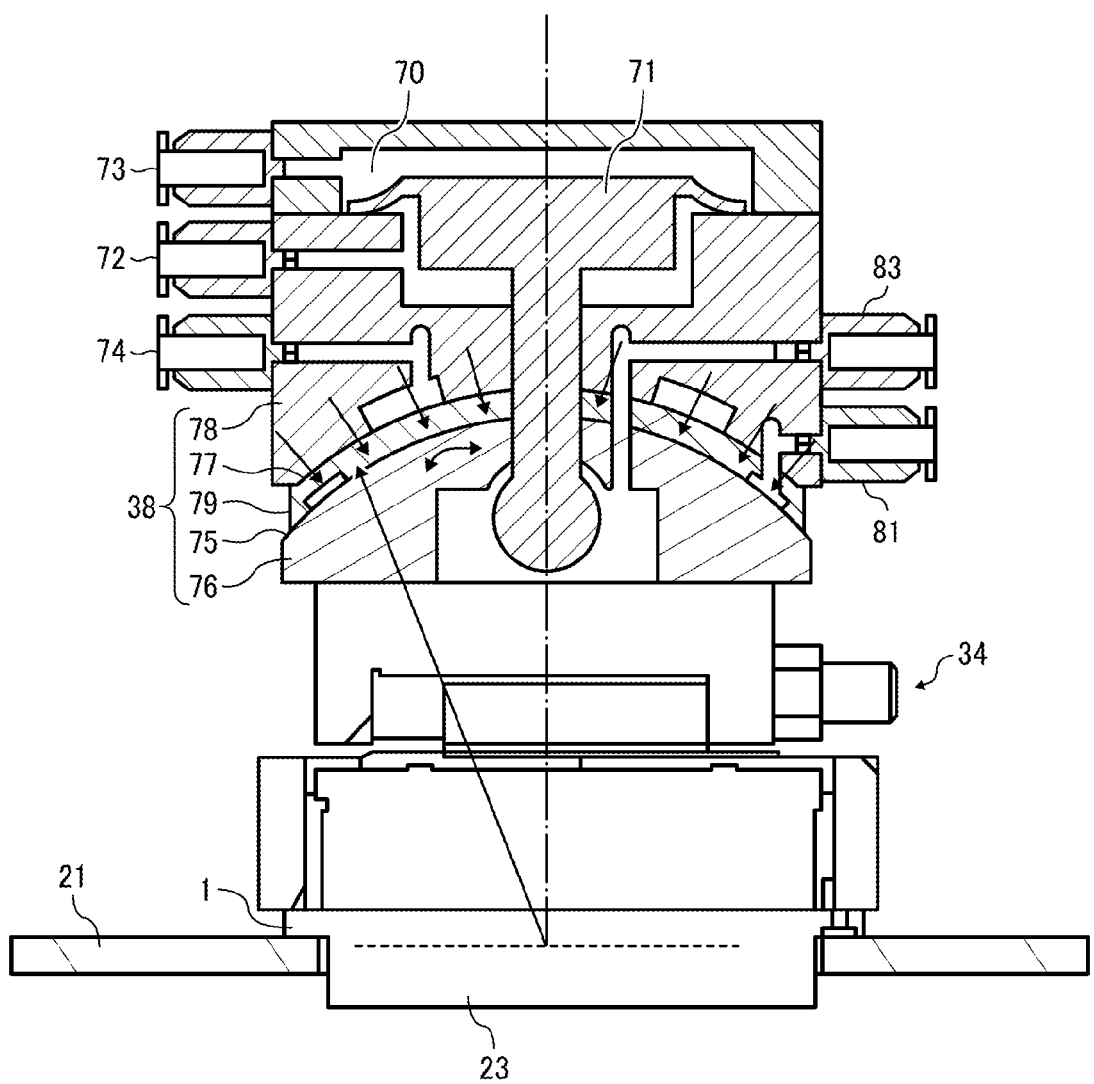
FIG. 8 is a cross-sectional view illustrating a structure of a joint surface copying device.

FIG. 8 is a cross-sectional view illustrating a structure of the joint surface copying device.

The joint surface copying device 38 as illustrated in FIG. 8 includes a spherical surface member 76 having a convex spherical surface 75 and securely disposed on the clamp unit 34, a shaft bearing 79 having a concave spherical surface 77 to receive the spherical surface member 76, and a receiving member 78 having a concave spherical surface to receive the shaft bearing 79. The convex spherical surface 75 of the spherical surface member 76 freely moves along the concave spherical surface 77 of the shaft bearing 79 via the shaft bearing 79 including an air floatation capability. With this movement, when the droplet discharge head 23 contacts the head unit base 21, the parallelism between them is automatically fit substantially completely. Air supply to the concave spherical surface 77 of the shaft bearing 79 is performed by a compressed air from an air supply port 74, which constitutes an air floatation mechanism or air cylinder mechanism.

In addition, a lock mechanism in the joint surface copying device 38 is performed as follows. Specifically, a cylinder 70 and a piston 71 contained in the cylinder 70 are disposed along the spherical surface member 76, the shaft bearing 79, and the receiving member 78. When the air is supplied to a lock port 72 of the air cylinder mechanism, the piston 71 is moved upward, and a position and posture of the spherical surface member 76 is locked relative to the receiving member 78 via the piston 71. When the air is supplied to a free port 73, the piston 71 moves downward, so that a lock is released and the spherical surface member 76 freely copies relative to the receiving member 78. At this time, the frame member 1 is pumped to vacuum via a vacuum port and is brought to a vacuum contact.

Similarly, the droplet discharge head 23 is pumped to vacuum by the vacuum pump via a vacuum port 83 and is brought to a vacuum contact. The convex spherical surface 75 of the spherical surface member 76 and the concave spherical surface 77 of the shaft bearing 79 can be held by a vacuum contact via the vacuum pump through a vacuum port 81. The holding power via the vacuum pump through a vacuum port is weaker than the holding power of the lock mechanism. Either the air cylinder mechanism or the vacuum contact mechanism can be applied to the lock mechanism via the joint surface copying device 38.

Next, a copying and holding mechanism will be described. First, an adjustment of parallelism between the head unit base 21 and the clamp unit 34 to hold the droplet discharge head 23 will be described. As described in FIG. 8, air is supplied to the free port 73 in the joint surface copying device 38 so that the spherical surface member 76 becomes free relative to the receiving member 78. In this state, a second holder is lifted up and a second part is pressed to a first part. Then, the droplet discharge head 23 is copied to the head unit base 21 by the joint surface copying device 38, that is, the parallelism between the droplet discharge head 23 and the head unit base 21 is fit substantially completely. After the copying operation, air is supplied to the lock port 72, and in a state in which the parallelism is adjusted, the spherical surface member 76 is once locked relative to the shaft bearing 79. Because the spherical surface member 76 is held to a vacuum contact with the droplet discharge head 23 via the clamp unit 34, the parallelism between the head unit base 21 and the droplet discharge head 23 is adjusted and maintained due to the lock of the spherical surface member 76.

Figure 9:
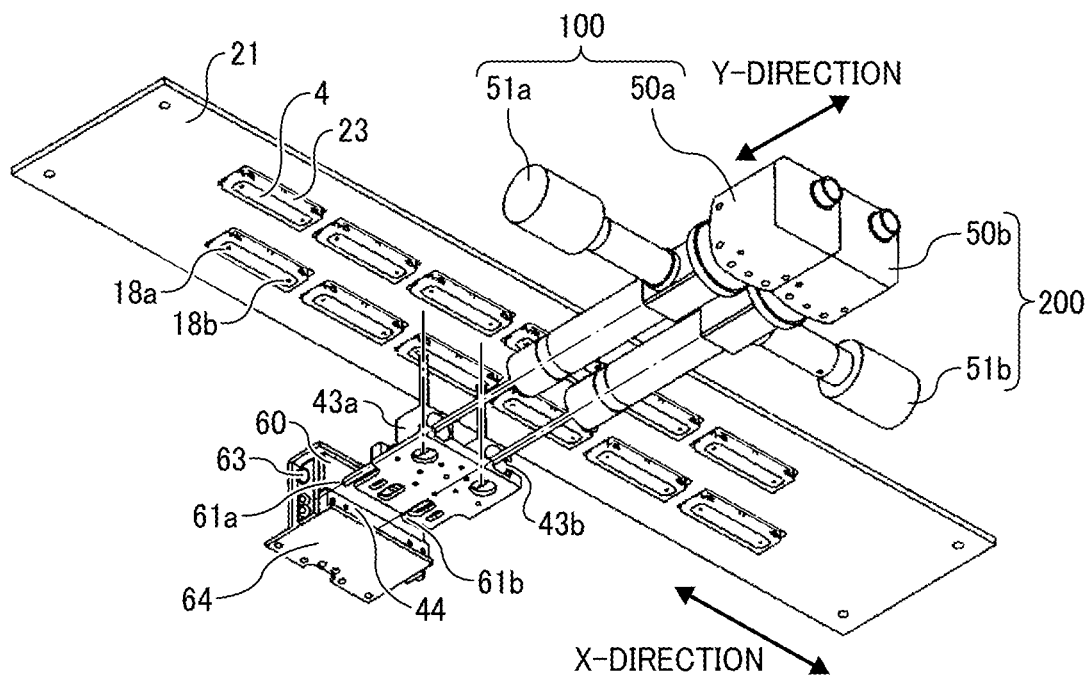
FIG. 9 is a perspective view of an optical detection system and various parts disposed in an optical path thereof.

FIG. 9 is a perspective view of optical detection systems 100, and 200 and various parts disposed in an optical path thereof.

Each of the optical detection systems 100, and 200 includes a CCD camera 50. On an optical path of the light that the CCD camera 50 receives, a half mirrors 43a, and 43b each serving as a beam splitter, and a glass chart 60 are disposed. The glass chart 60 includes reference marks that show a reference position of the droplet discharge head 23. The reference position of the droplet discharge head 23 is shown by the nozzle alignment marks 18a, and 18b formed on the nozzle plate 4. The half mirrors 43a, and 43b introduce light beams responding to the nozzle alignment marks 18a, 18b disposed on the nozzle plate 4 of the droplet discharge head 23 and light beams responding to the reference marks disposed on the glass chart 60, to the CCD cameras.

Figure 10:
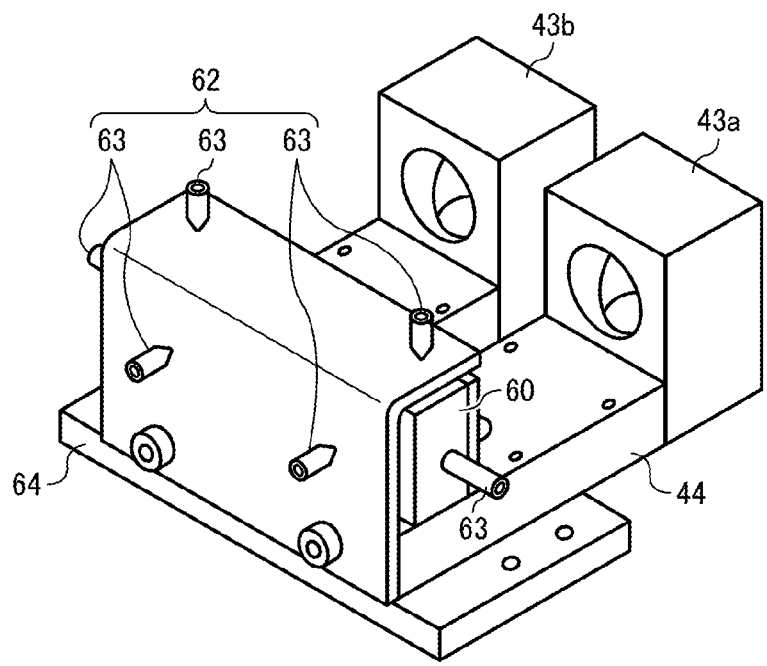
FIG. 10 is a perspective view illustrating a portion fixing a glass chart.

FIG. 10 is a perspective view illustrating a portion securing a glass chart.

The glass chart 60 is fixedly mounted on a glass chart base 44. The glass chart base 44 connects to an upper base (θ-direction movable portion) of the XYθ stage 37 via a glass chart connection block 64 and is allowed to move by the XYθ stage 37. The glass chart base 44 connects to an upper base (θ-direction movable portion) of the XYθ stage 37 via a glass chart connection block 64 and is allowed to move by the XYθ stage 37. The two half mirrors 43a, and 43b are also fixedly mounted on the glass chart base 44 and are moved by the XYθ stage 37.

Figure 11:
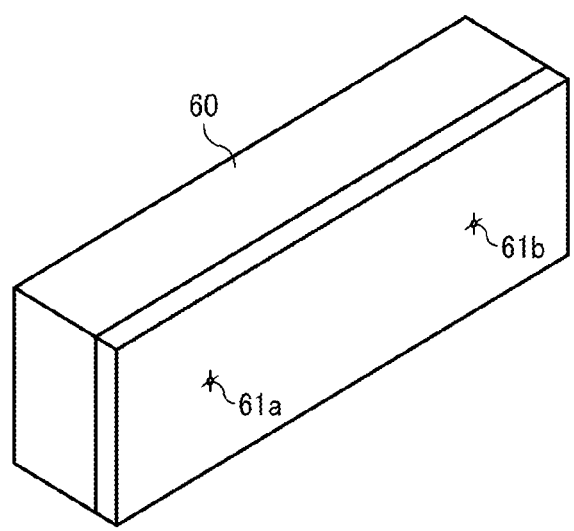
FIG. 11 is a perspective view illustrating a glass chart on which reference marks are formed.

FIG. 11 is a perspective view illustrating the glass chart 60 on which reference marks 61a, 61b are embedded. The reference mark 61 may be described in a singular form inclusively for simplification.

The glass chart base 44 is formed of a SUS substrate and quartz glass laminated thereon, and the reference marks are formed of a reflective chrome film that is formed by exposing and transferring a mask pattern on the quartz glass. As illustrated in FIG. 11, two reference marks 61a, 61b each include a ring-shape having an external diameter of 500 [μm] and an internal diameter of 490 [μm] and a reticle or cross line having a line width of [5 μm]. A distance between the both is adjusted within a precision of ±1 [μm]. The position and posture of the glass chart 60 is adjusted using the posture and position adjuster 62. As illustrated in FIG. 10, the position of the glass chart 60 is adjusted using the posture and position adjuster 62. Specifically, lateral, vertical, and proximal to distal position of the glass chart 60 is adjusted by six clamp bolts and is fixedly mounted.

The two optical detection systems 100, and 200 detect the nozzle alignment marks 18a, 18b disposed at longitudinal lateral ends of the nozzle plate 4, and the reference marks 61a, 61b disposed at longitudinal lateral ends of the glass chart 60 as references for adjusting the nozzle alignment marks 18a, 18b, respectively. Specifically, the first optical detection system 100 images the nozzle alignment mark 18a and the reference mark 61a simultaneously with a CCD camera 50a and the second optical detection system 200 images the nozzle alignment mark 18b and the reference mark 61b simultaneously with a CCD camera 50b. The optical detection systems 100, and 200 include coaxial epi-illuminators 51a, 51b, respectively, in addition to the CCD cameras 50a, 50b.

Herein, an optical path of the light received by the CCD camera 50 of the optical detection systems 100, and 200 will be described. The reference code 50 may be employed for the CCD camera 50 in singular form inclusively for simplification.

FIG. 12 is a schematic side view illustrating manual triaxial stages 53a, 53b, 53c for adjusting positions of CCD camera of the first optical detection system 100. Herein, an optical path of the light received by the CCD camera 50 of the optical detection system 100 will be described. Functions of the optical detection system 200 are the same.

The position of the CCD camera 50 can be adjusted using the manual triaxial stages 53a, 53b, 53c. As illustrated in FIG.

12, the manual triaxial stage 53c is used to adjust the position of the CCD camera 50 in the X-direction that is a pitch direction of the nozzle alignment marks 18a, 18b. The manual triaxial stage 53a is used to adjust the position in the Y-direction that is a distal direction of the CCD camera 50, and the manual triaxial stage 53b is used to adjust in the Z-direction that is a direction to adjust a height of the CCD camera vertically.

The illumination light from the coaxial epi-illuminator 51a of the first optical detection system 100 is emitted along an optical axis of the CCD camera 50a and is split into two optical paths L1 and L2 via the half mirror 43. The optical path L1 passes through the half mirror 43 to go forward to reach the glass chart 60 on which the reference mark 61 is disposed, is reflected by the glass chart 60, and passes again the half mirror 43 and returns to the CCD camera 50. The optical path L2 is deflected by the half mirror 43 by 90 degrees, reaches the nozzle alignment marks 18a, 18b of the droplet discharge head 23 placed on the head unit base 21 and is reflected, and passes again the half mirror 43 and returns to the CCD camera 50. The optical path L2 is used for detecting an adjustment target mark 47 of a master work 46 in the optical axis adjustment, which will be described later. The half mirror 43 is disposed such that light along the optical paths L1 and L2 is focused on the CCD camera 50, and a kind of double focus optical detection system is constructed. In addition, the CCD camera 50 includes a high magnification (×6) machine vision lens and can detect the reference mark 61, the nozzle alignment mark 18, and the adjustment target mark 47 by magnification.

<Previous Adjusting Process>

Next, a previous adjusting process to be performed before alignment process will be described, in which each droplet discharge head 23 is positioned on the head unit base 21 using the assembly device according to an embodiment of the present invention.

Figure 13:
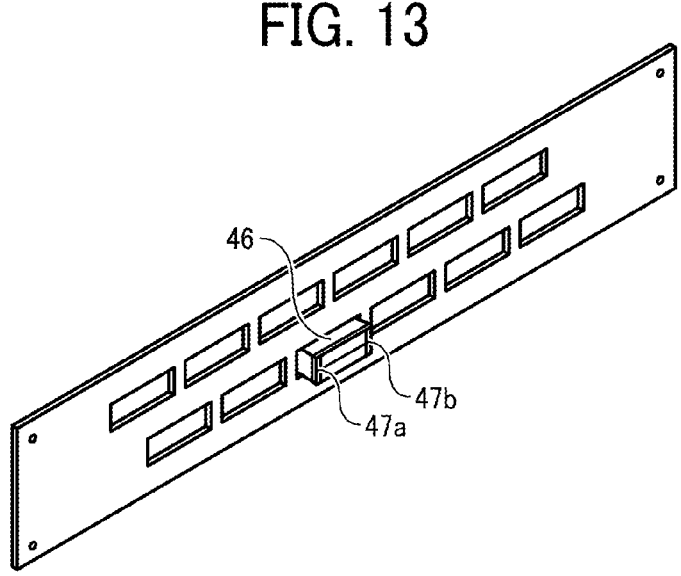
FIG. 13 is a perspective view illustrating a master work on which an adjustment target mark is disposed.

The previous adjusting process of the assembly device is performed such that the master work 46 as illustrated in FIG. 13 is fixedly mounted on the head unit base 21, and the position of the half mirror 43 and the glass chart 60 is adjusted and fixedly mounted thereon. The master work 46 is provided with the adjustment target marks 47a, 47b as respective adjustment target positions of the nozzle alignment marks 18a, 18b. The master work 46 is formed of a SUS substrate and quartz glass laminated thereon, and the adjustment target marks 47a, 47b are formed of a reflective chrome film that is formed by exposing and transferring a mask pattern on the quartz glass. An exemplary adjustment target mark 47 as illustrated in FIG. 13 includes a solid shape having a diameter of 80 [μm] and a reticle or cross line having a line width of [5 μm] forming two adjustment target marks 47a, 47b, whose distance is adjusted within a precision of ±1 [μm]. The adjustment target marks 47a, 47b are positioned with the same pitch distance between the reference marks 61a, 61b.

In the previous adjusting process of the assembly device, the position of the half mirror 43 and the glass chart 60 is adjusted such that the adjustment target marks 47a, 47b of the master work 46 and the reference marks 61a, 61b of the glass chart 60 are aligned with the image taken by the CCD camera 50. With this process, the position of each of the reference marks 61a, 61b of the glass chart 60 is adjusted at a position corresponding to the adjustment target marks 47a, 47b of the master work 46. Because the adjustment target marks 47a, 47b of the master work 46 show ideal joint positions from an external reference of the head unit base 21 in the nozzle alignment mark 18 disposed in the nozzle hole 11, the positions of the reference marks 61a, 61b of the glass chart 60 are properly adjusted as reference positions when the next droplet discharge head 23 is aligned later.

Hereinafter, in the previous adjustment process of the assembly device, alignment of the position of the adjustment target mark 47 of the master work 46 and the position of the reference mark 61 of the glass chart 60 will be described in detail.

Figure 14A:
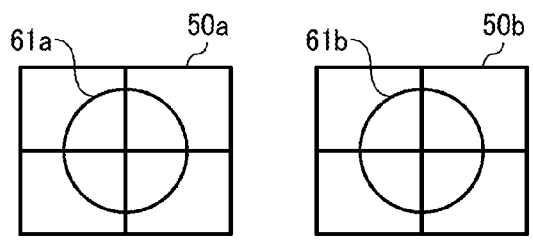
FIGS. 14A to 14C illustrates images detected by two CCD cameras.
Figure 14B:
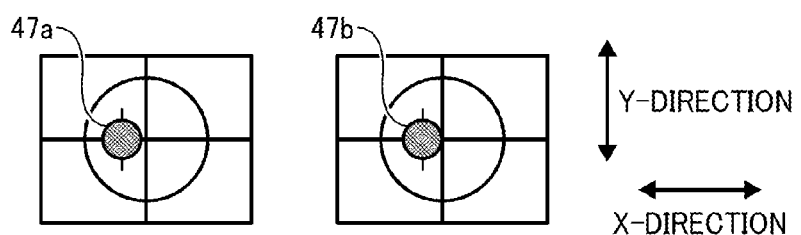
Figure 14C:
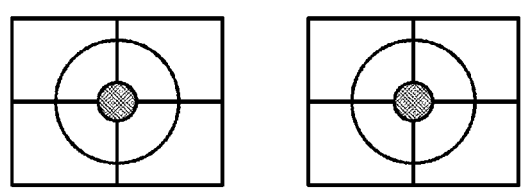

FIGS. 14A to 14C illustrates images detected by two CCD cameras.

First, the glass chart 60 is disposed at a predetermined designed position. Then, using the manual triaxial stages 53a (for Y-direction adjustment), 53b (for Z-direction adjustment), and 53c (for X-direction adjustment), detected images along the optical path L1 of the reference marks 61a, 61b of the glass chart 60 are focused on the center of each image. The adjustment is performed such that the detected images imaged by the CCD cameras 50a, 50b becomes as illustrated in FIG. 14A.

Next, the master work 46 is fixedly mounted on a predetermined designed position on the head unit base 21. Successively, the head unit base 21 is fixed on the unit base fixture 25 of the assembly device while the head unit base 21 is being abutted to the reference pins 27, 28, and 29 each as a positioning member of the assembly device. The height and posture of the glass chart 60 relative to the glass chart base 44 is adjusted so that the Y-direction positions of the adjustment target marks 47a, 47b of the master work 46 align with the Y-direction positions of the reference marks 61a, 61b of the glass chart 60. Further, the Y-direction positions of the half mirrors 43a, 43b are adjusted relative to the glass chart base 44 and the half mirrors 43a, 43b are fixedly mounted on the glass chart base 44.

In this case, to focus the detected images of the adjustment target marks 47a, 47b on the CCD camera 50, the positions of the CCD cameras 50a, 50b in the Y-axis distal direction are moved using the manual triaxial stage 53a. When the positions of the CCD cameras 50a, 50b in the Y-axis direction being the distal direction of the CCD cameras 50a, 50b are adjusted, the detected images along the optical path L1 of the reference marks 61a, 61b of the glass chart 60 are out of focus. Thus, a minute adjustment is performed on the position of the glass chart 60 in the proximal to distal direction (being an optical axis direction of the light incident to the glass chart 60) using the posture and position adjuster 62. As a result, the detected images imaged by the CCD cameras 50a, 50b becomes, for example, as illustrated in FIG. 14B.

Then, adjustment is performed using the manual triaxial stage 53b (for Z-direction adjustment) and 53c (for X-direction adjustment), such that the detected images along the optical path L2 of the adjustment target marks 47a, 47b of the master work 46 are focused on the center of respective images.

Further, a minute adjustment is performed on the position of the glass chart 60 in the X-direction using the posture and position adjuster 62 and fixedly mounted such that the detected images along the optical path L1 of the reference marks 61a, 61b of the glass chart 60 are focused on the center. As a result, the detected images imaged by the CCD cameras 50a, 50b, that is, the images of the adjustment target marks 47a, 47b and the images of the reference marks 61a, 61b are each focused at the center as illustrated in FIG. 14C.

<Alignment Process>

Next, using the assembly device that has been subjected to the previous adjusting process, an alignment process is performed in which each droplet discharge head 23 is positioned with respect to the head unit base 21.

In the following description, a joining process following the alignment process will also be described.

The pressure stage 36 includes a pressure position (or a lowering position), an escaping position (or a lifting position), and a clamp position. When the droplet discharge head 23 mounted temporarily on the head unit base 21 is moved by the XY stage 30, the pressure stage 36 is raised to such a position that the clamp unit 34 of the pressure stage 36 does not interfere with the droplet discharge head 23, which is the escaping position. The position of the clamp position corresponds to the position in which the droplet discharge head 23 is clamped and retained when the droplet discharge head 23 is positioned on the head unit base 21 in the alignment process. In the clamp position, the clamp unit 34 is positioned such that the droplet discharge head 23 is held slightly apart from the head unit base 21. In the pressure position, the pressure stage 36 applies a predetermined joining force between the droplet discharge head 23 and the head unit base 21 in the joining process.

In addition, the XYθ stage 37 causes the whole assembly device to perform alignment based on the detected image obtained by the optical detection systems 100, and 200 and a command calculated by an image processor 300 as illustrated in FIG. 12. Specifically, the image processor 300 calculates positional shift amounts between the nozzle alignment marks 18a, 18b of the droplet discharge head 23 in the detected image imaged by the optical detection systems 100, and 200 and the reference marks 61a, 61b of the glass chart 60 in the detected image imaged by the optical detection systems 100, and 200 and outputs a shift command to cause the XYθ stage 37 to shift in the X-direction, Y-direction, and θ-direction to cancel each of the positional shift amounts. The shift command is sent to a drive controller of the XYθ stage 37 to cause the drive controller to move the XYθ stage 37 accordingly. In the present embodiment, the clamp unit 34 and the XYθ stage 37 constitute an adjustment means.

Figure 15:
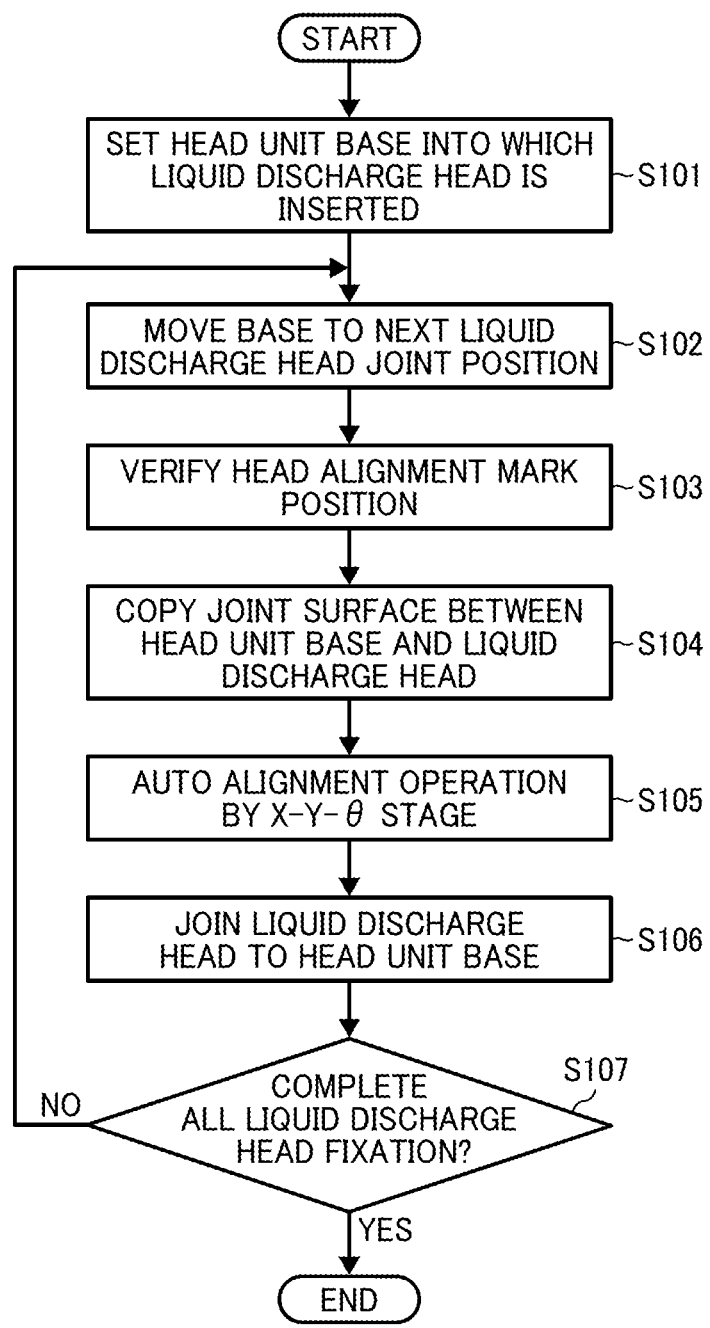
FIG. 15 is a flowchart to show steps in a process from temporary installation to completion of fixing the droplet discharge head.

FIG. 15 is a flowchart from a provisional disposition of the droplet discharge head to a joining process thereof.

First, the droplet discharge head 23 is inserted into a through-hole of the head unit base 21 temporarily under a loose engagement and the head unit base 21 is set at a predetermined position on the unit base fixture 25 of the assembly device with screws (in Step S101), In this case, the pressure stage 36 is raised to the escaping position.

Next, the head unit base 21 is moved using the XY stage 30 so that the droplet discharge head 23 which is subjected to the alignment process and joining process positions at a joint position (S102).

Then, the pressure stage 36 is lowered to the clamp position. The droplet discharge head 23 is clamped and held by the clamp unit 34 at this position. Thereafter, the image processor 300 verifies whether or not the nozzle alignment marks 18a, 18b are captured in the image angle of the CCD cameras 50a, 50b (S103). If the nozzle alignment marks 18a, 18b are captured in the image angle of the CCD cameras 50a, 50b, the process moves on to a next Step S104.

Next, after releasing a lock of the joint surface copying device 38, the pressure stage 36 is lowered to the pressure position while controlling load to generate a predetermined load, the joint surface between the head unit base 21 and the droplet discharge head 23 is copied (S104).

Then, after the joint surface copying device 38 is locked in the joint surface copying state, the CCD cameras 50a, 50b image the reference marks 61a, 61b of the glass chart 60 and the nozzle alignment marks 18a, 18b on the same viewing field and detected images are obtained. Based on the detected images, the image processor 300 calculates positional shift amount, and outputs a shift command to the XYθ stage 37 as position adjustment amounts. Thus, as a result of the alignment operation of the XYθ stage 37, the head unit base 21 is aligned relative to the droplet discharge head 23 held by the clamp unit 34 so that the positions of the reference marks 61a, 61b of the glass chart 60 and the nozzle alignment marks 18a, 18b are aligned to the detected images (S105).

After the alignment process, the pressure stage 36 is lowered to the pressure position while controlling the load to generate a predetermined load. Then, the UV adhesive adhered on the droplet discharge head 23 is cured by the UV light of the curing process unit 35, and the droplet discharge head 23 is adhered and fixedly mounted to the head unit base 21 (S106).

When adhesion of all the droplet discharge heads 23 is complete, after the pressure stage 36 is moved to the escaping position, the head unit base 21 is moved to a detachment position by the XY stage 30, and the head unit base 21 is removed and process ends (S107).

If adhesion of all the droplet discharge heads 23 is not complete, after the pressure stage 36 is moved to the escaping position, the head unit base 21 is moved to a joint position of the next droplet discharge head 23 by the XY stage 30 (S102). After the head unit base 21 is moved to a joint position of the next droplet discharge head 23, the aforementioned steps from S103 to S106 are sequentially repeated until adhesion of all the droplet discharge heads 23 is complete.

Next, an effect of the alignment process according to the present embodiment will be described.

Figure 16:
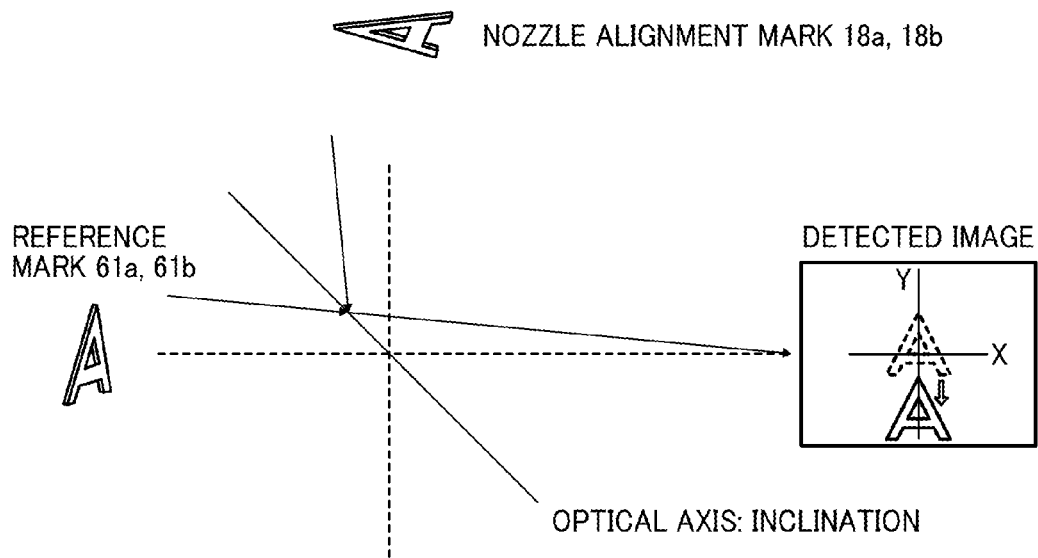
FIG. 16 illustrates how to compensate for optical axis inclination of a CCD of a double focus optical system.

FIG. 16 illustrates how to compensate for optical axis inclination of the CCD cameras of the double focus optical detection system in the present embodiment.

In accordance with the change in the environmental temperature, and the like, when the optical axis of the CCD camera 50 inclines upward as shown by a solid line of FIG. 16 than a broken line, the position of the imaged nozzle alignment mark in the detected image deviates downward (shown by a solid line) than the original position (shown by a broken line). To simplify, a letter A is used to schematically show the posture of the nozzle alignment mark 18 and the reference mark 61.

In the conventional master work position memory method, when the optical axis inclines upward due to an effect of the environmental temperature change, and the like, the nozzle alignment mark 18 deviates downward than the original position in the detected image. At this time, the position in the detected image of the master position data that is stored using the alignment mark remains as the original position. As a result, when the alignment process is performed such that the nozzle alignment mark 18 in the detected image matches the position in the detected image shown by the master position data, alignment error occurs by the amount that the nozzle alignment mark 18 deviates downward from the original position.

By contrast, according to the exemplary embodiment of the present invention, the reference mark 61 of the glass chart 60 adjusted at the target adjustment position of the master work by the previous adjusting process and the nozzle alignment mark 18 are imaged simultaneously and the detected images can be obtained. In this case, even when the optical axis inclines upward due to an effect of the environmental temperature change, the position of the reference mark 61 deviates downward (as shown by a solid line of FIG. 16) in the detected image from the original position (as shown by a broken line of FIG. 16). Accordingly, even though the optical axis inclines upward due to an effect of the environmental temperature change, the relative position between the nozzle alignment mark 18 and the reference mark 61 in the detected image does not change. As a result, when the alignment process is performed such that the nozzle alignment mark 18 in the detected image matches the position of the reference mark 61, no alignment error occurs differently from the conventional master work position memory method.

Figure 17:
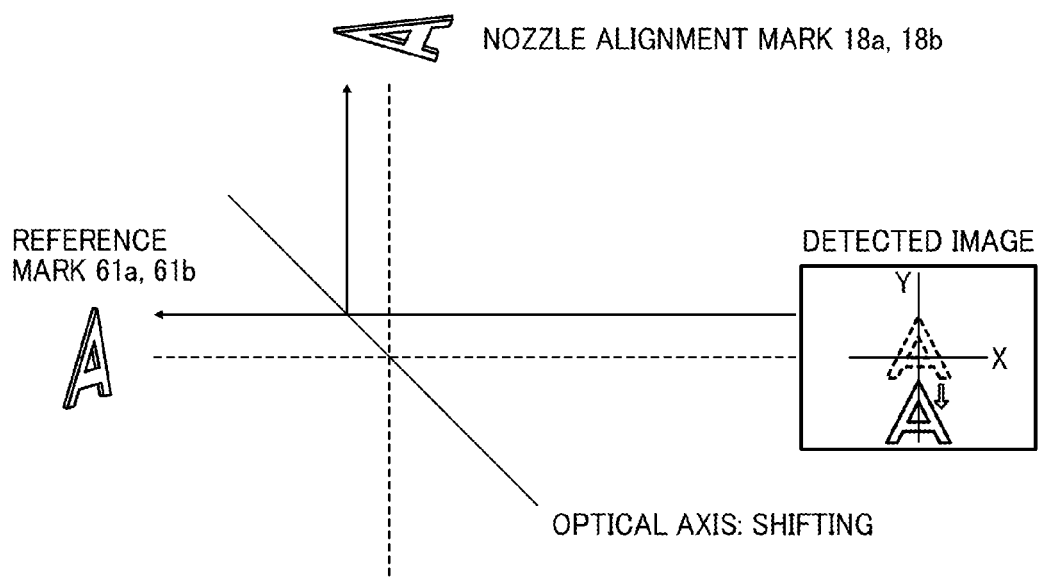
FIG. 17 illustrates how to compensate for optical axis shifting of a CCD of a double focus optical system.

FIG. 17 illustrates how to compensate for optical axis shifting of the CCD cameras of the double focus optical detection system in the present embodiment.

In accordance with the change in the environmental temperature, and the like, when the optical axis of the CCD camera 50 shifts upward as shown by a solid line of FIG. 17 than an original state as shown by a broken line of FIG. 17, the position of the imaged nozzle alignment mark 18 in the detected image deviates downward (shown by a solid line) than the original position (shown by a broken line).

In the conventional master work position memory method, when the optical axis shifts upward due to an effect of the environmental temperature, and the like, similarly to the case in which the optical axis inclines, alignment error occurs by the amount that the nozzle alignment mark 18 deviates downward from the original position.

By contrast, according to the present embodiment, when the optical axis shifts due to an effect of the environmental temperature change and the like, similarly to the case in which the optical axis inclines, the position of the reference mark 61 as well as the nozzle alignment mark 18 deviates downward as shown by the solid line of FIG. 16 in the detected image than the original position as shown by a broken line of FIG. 16. As a result, no alignment error occurs differently from the conventional master work position memory method.

It is therefore understood that, according to the present embodiment, even though the optical axis inclination or shifting occurs due to an effect of the environmental temperature change and the like, no alignment error occurs resulting from the above events. Accordingly, a plurality of droplet discharge heads 23 can be aligned and joined on the head unit base 21 with high precision. Positional relation between the nozzle hole 11 and the nozzle alignment mark 18 in the nozzle plate 4 of each of the droplet discharge head 23 can be processed with high precision due to a precision of the process machine. By implementing the above-described alignment process based on the nozzle alignment mark 18, a plurality of writing head units is aligned with the nozzle hole 11 positioned with high precision, so that the droplet discharge head unit can be assembled optimally while securing high precision droplet landing positions.

The assembly device of the present embodiment employs the reference mark 61 formed on the glass chart 60 having the substantially same size as that of the droplet discharge head 23, as a member to show a master position for positioning the droplet discharge head 23. Then, the nozzle alignment marks 18a, 18b disposed on the nozzle plate 4 of the droplet discharge head 23 as a target for positional adjustment are sequentially aligned with the reference marks 61a, 61b disposed on the glass chart 60. By contrast, the conventional assembly device employs alignment masks on which the position of the carriage and the master position of each droplet discharge head are patterned as a member to show the master position for positioning the droplet discharge head 23. The alignment mask is produced with the same size as that of the carriage, so that the costs are high compared to the size of the droplet discharge head 23. Further, the above device is not suitable for another type of apparatus with a different carriage size or a different number of writing heads.

The XY stage 30 may include, as a mechanism to move the head unit base 21 fixedly mounted thereon via the unit base fixture 25 in the X-, and Y-axis directions, a linear motor as a drive unit for each axis direction and a guide member with high precision. The XY stage 30 employs glass-made linear scales $26x$, $26y$ as a position detector for each axis direction. Thus, the head unit base 21 can be moved with high precision by being driven by a high precision linear motor and guided by a high precision guide member. Further, because the shift amount in the moving direction can be measured by the high precision glass-made linear scales $26x$, $26y$, the head unit base 21 can be positioned with a high precision and reproducibility.

Further, positioning accuracy of the XY stage 30 positioned based on the glass-made linear scales $26x$, $26y$ is previously obtained, an absolute precision is otherwise obtained using a high precision measuring device such as a laser measuring device, and the above two are compared. The positioning accuracy error data is previously stored in the correction table, so that the positioning accuracy can be improved to a submicron precision level. With such architecture, the plurality of droplet discharge heads 23 is disposed and fixedly mounted on the head unit base 21, so that the integrated droplet discharge head unit that is formed by joining the droplet discharge heads together is assembled.

As described heretofore, in the present embodiment, the droplet discharge head unit configured such that the plurality of droplet discharge heads 23 is mounted on the head unit base 21 in two-row staggered arrangement that is employed in the inkjet recording apparatus as an image forming apparatus of the droplet discharge recording method. However, the present invention is not limited only to this. Other than this, regardless of a line scan head or serial scan head, the present embodiments of the present invention may be applied to the one in which a plurality of droplet discharge heads 23 is mounted at a predetermined position of the head holder for multicolor application, longer writing means, higher density, and the like, and optimal effects can be obtained in any application. Further, the present embodiments of the present invention may be applied to any writing head unit including the droplet discharge heads and organic LED heads that are mounted to respective predetermined positions of the holder, and optimal effects can be obtained in any application.

The aforementioned embodiments are examples and specific effects can be obtained for each of the following aspects of (A) to (L):

<Aspect A>

An assembly device of a writing head unit includes an imaging means such as a CCD camera 50 to image a writing head such as a plurality of droplet discharge heads 23 temporarily mounted on a head holder such as a head unit base 21; a fine adjustment means to adjust a relative position of the head holder and the writing head using the detected image of the writing head imaged by the imaging means; an optical means such as a half mirror 43 to focus images of the reference mark 61 to show a reference position of the writing head disposed in a direction different from the writing head, and the writing head on the same viewing field; and an adjustment means to adjust the writing head using the images of the writing head and the reference mark taken simultaneously by the imaging means.

The conventional assembly device employs a master work position memory method, in which the master position data of the plurality of droplet discharge heads is first stored using the alignment mask and then each of the droplet discharge heads temporarily mounted on the carriage is positioned and fixedly mounted. In this method, a considerably long time lapses from storing the master position data to the completion of positioning and securing all the droplet discharge heads. As a result, environmental temperature changes tending to occur during that time cause the optical axis of the imaging means to deviate or shift, producing errors due to the deviation or shifting of the optical axis between the detected images when the master position data is stored and the position data for the droplet discharge head is obtained. When the fine adjustment means performs positioning based on the positional data of the droplet discharge heads obtained from the imaged data including such an error and the master position data, the positioning accuracy is degraded. The optical axis deviation or shifting can be restricted by strictly controlling the temperature of the imaging means; however, to implement this requires a very expensive temperature control system, which is impractical.

The above problem is not limited to the writing head unit using the droplet discharge head as a writing head. For example, the writing head unit that employs organic LED heads, in which the organic LED head is mounted at a predetermined position of the head holder for the longer, denser head, will encounter the same type of problem.

In the aspect A, via optical means, the writing head and the reference mark to show a reference position disposed in a direction different from that of the writing head are focused on the imaging means on the same viewing field, and are imaged simultaneously by the imaging means. As a result, alignment error caused by optical axis inclination or shifting of the imaging means due to an effect of the environmental temperature change between the imaging time of the writing head and the imaging time of the reference mark, does not occur. Specifically, even though there is a change in the environmental temperature, the detected image of the writing head and the detected image of the reference mark are simultaneously taken in the optical axis under the environmental temperature when the image is taken. Accordingly, the image of the writing head and the image of the reference mark are taken under the same effect of the environmental temperature. In the present embodiment, because the detected images thus taken are used, effect of the environmental temperature when imaged is offset and no adjustment error occurs. Accordingly, as described in the above embodiments, the writing head can be mounted on the head holder with high precision.

Further, according to the present embodiment, the nozzle alignment mark 18 of the recording head as an adjustment target and the reference mark 61 are imaged simultaneously for the adjustment. Specifically, the reference mark corresponding to the size of the recording head is used for the adjustment of the target recording head. On the other hand, in the conventional assembly device, the alignment mask was used as a member to indicate the reference position of the recording head. The alignment mask is formed by patterning the master position of the head holder and the position of each recording head. Because the alignment mask is produced corresponding to the size of the head holder, which is larger than the size of the writing head and therefore, the cost of the alignment mask is high. Furthermore, if the size of the head holder or the number of the writing heads to be mounted on the head holder is different, assembling the writing heads on the head holder is difficult using the alignment mask. The assembling device according to the aspect A may solve the aforementioned problems.

<Aspect B>

In the aspect A, the adjustment means includes a retainer such as a clamp unit 34 to hold the writing head that is temporarily held on the head holder; an alignment means such as an XYθ stage 37 to minutely move the head holder. The imaging means images alignment marks such as nozzle alignment mark 18 corresponding to the writing head and reference marks simultaneously. A positional error amount is calculated based on the detected images imaged by the imaging means. The alignment means minutely moves the head holder based on the calculated positional error amount with the recording head held by the retainer or the clamp unit 34, so that relative positions of the head holder and the writing head is adjusted.

With this structure, the above adjustment can be comparatively easily performed.

<Aspect C>

In the aspect B, the imaging means, the reference mark, and the optical means are integrally disposed on the above alignment means.

According to this, as described in the above embodiment, because the imaging means, the reference mark, and the optical means are integrally disposed on the above alignment means, the positional relation between the integrally disposed devices does not change from a first optical adjustment.

<Aspect D>

In any of the aspects A to C, the nozzle alignment marks 18*a*, 18*b* are disposed at longitudinal lateral ends of the writing head, respectively, and the reference marks 61*a*, 61*b* are disposed as references for adjusting the nozzle alignment marks 18*a*, 18*b*, respectively. Imaging means such as two CCD cameras 50*a*, 50*b* image the reference marks 61*a*, 61*b* simultaneously on the same viewing field.

With this structure, as described in the above embodiments, because two imaging means are disposed, alignment is performed using detected images obtained simultaneously using two alignment marks for one writing head, positioning can be performed with higher precision.

<Aspect E>

In any of the aspects A to D, the glass chart base 44 is formed of a SUS substrate and quartz glass laminated thereon, and the reference marks are formed of a reflective chrome film that is formed by exposing and transferring a mask pattern on the quartz glass.

With this structure, the reference marks can be formed simply with the reflective surface, so that the reference mark can be obtained inexpensively. Further, the reference marks are formed of a reflective chrome film, which can be detected by the coaxial epi-illuminators 51*a*, 51*b*, respectively. Because transmitted light that is incident from a rear surface of the glass chart is not required, design of the apparatus may be simplified and the cost of the apparatus can be reduced.

<Aspect F>

In any of the aspects A to E, an optical means is configured such that the beam splitter such as the half mirrors 43*a*, 43*b* and the glass chart 60 are disposed on the optical path of the light that the imaging means such as the CCD camera 50 receives.

With this structure, as described in the above embodiment, the optical axis of the epi-illuminator 51 is divided by the beam splitter and the first optical path can be focused on the reference marks 61*a*, 61*b* easily, so that the reference marks 61*a*, 61*b* disposed in the direction different from the positions of the nozzle alignment marks 18*a*, 18*b* of the writing head can be imaged with the same imaging means.

<Aspect G>

In any of the aspects A to F, a curing process unit 35 is disposed. When the writing head is mounted on the head holder at a position adjusted by the fine adjustment means, a UV adhesive adhered on the writing head is cured by the curing process unit 35, so that the writing head is securely held on the head holder.

With this structure, the writing head can be secure to the head holder when positioned with high precision.

<Aspect H>

In the aspect G, a pressure member such as a pressure actuator 39 that can control a weight is disposed. The pressure actuator 39 presses the writing head against the head holder to complete joining of the writing head to the head holder by the curing process unit 35 that cures the UV adhesive.

With this structure, as described in the above embodiments, the writing head pressed by the pressure actuator against the head holder can be fixedly mounted to the head holder by the curing process unit 35.

<Aspect I>

In the aspect H, a joint surface copying device 38 is disposed between the pressure member and the writing head such that a parallelism between contact surfaces of the writing head and the head holder is implemented, when the pressure member presses the writing head against the head holder.

With this structure, as described in the above embodiment, in joining the writing head with the head holder, the parallelism between them is automatically fit substantially completely.

<Aspect J>

In any of the aspects A to I, a holder moving means such as an XY stage 30 to move the head holder on which a plurality of writing heads are mounted temporarily is disposed. The holder moving means moves the head holder with a predetermined pitch distance of each writing head and the fine adjustment means sequentially adjusts a position of each writing head.

With this structure, as described in the above embodiments, the plurality of recording heads can be positioned sequentially with high precision.

<Aspect K>

In the aspect 1, the holder moving means includes at least three positioning members such as reference pins 27, 28, and 29, to which the head unit base 21 is brought to contact, and is fixedly mounted on the holder moving means.

With this structure, the head holder can be positioned with respect to the holder moving means easily with high precision.

<Aspect L>

A method for assembling a writing head unit includes an imaging process to image the writing head such as the plurality of droplet discharge heads 23 temporarily mounted on the head holder such as the head unit base 21; and adjusting process to adjust relative positions between the plurality of writing heads and the head holder using obtained images of the writing head. In the imaging process, reference marks indicating reference positions of the writing head disposed in the direction different from the writing head and the writing head are simultaneously imaged on the same viewing field, and in the adjusting process, the adjustment is performed based on the simultaneous images of the writing head and the reference marks.

With this structure, as described heretofore, the writing head can be precisely positioned on the head holder.

What is claimed is:

1. An assembly device for a writing head unit including one or more writing heads mounted on a head holder, comprising:
    an imaging unit to image the writing head in a state in which the writing head is mounted on the head holder;
    an adjuster to adjust relative positions of the head holder and the writing head mounted on the head holder; and
    an optical unit to focus images of reference marks and an alignment mark of the writing head, simultaneously on the same viewing field of the imaging unit, the reference marks indicating a reference position of the writing head and disposed in a direction different from the writing head with respect to the imaging unit,
    wherein a beam splitter of the optical unit is disposed at a position to receive both (i) light reflected from the writing head and (ii) light reflected from a member including the reference marks, and
    wherein the adjuster adjusts the relative positions of the head holder and the writing head using images of the alignment mark and the reference marks, imaged simultaneously by the imaging unit.

2. The assembly device as claimed in claim 1, further comprising a retainer to hold the writing head that is held on the head holder,
    wherein the adjuster moves the head holder based on a positional error calculated from images that the imaging unit images simultaneously the alignment mark of the writing head and the reference marks, with the writing head retained by the retainer, so that relative positions of the head holder and the writing head are adjusted.

3. The assembly device as claimed in claim 2, wherein the imaging unit, the reference marks, and the optical unit are disposed on the adjuster.

4. The assembly device as claimed in claim 1, wherein:
    the imaging unit comprises two cameras;
    the reference marks are disposed as references for adjusting nozzle alignment marks disposed at longitudinal lateral ends of the writing head; and
    the two cameras simultaneously image the two reference marks each aligned to a corresponding one of the nozzle alignment marks on the same viewing field.

5. The assembly device as claimed in claim 4, further comprising a glass chart formed of a SUS substrate and quartz glass laminated thereon,
    wherein the reference marks are formed of a reflective chrome film that is formed by exposing and transferring a mask pattern onto the quartz glass.

6. The assembly device as claimed in claim 1, further comprising a beam splitter,
    wherein the optical unit is configured such that the beam splitter and a glass chart are disposed on an optical path of light that the imaging unit receives.

7. The assembly device as claimed in claim 1, further comprising a curing unit that cures a UV adhesive adhered on the writing head and fixedly mounts the writing head on the head holder in a state in which the writing head is mounted on the head holder at a position adjusted by the adjuster.

8. The assembly device as claimed in claim 7, further comprising a pressure member that presses the writing head against the head holder to complete joining of the writing head to the head holder by the curing unit that cures the UV adhesive.

9. The assembly device as claimed in claim 8, further comprising a joint surface copying device disposed between the pressure member and the writing head to keep contact surfaces of the writing head and the head holder flush against each other when the pressure member presses the writing head against the head holder.

10. The assembly device as claimed in claim 1, further comprising a holder moving unit to move the head holder on which a plurality of writing heads are mounted,
    wherein the holder moving unit moves the head holder a predetermined pitch distance of each writing head and the adjuster sequentially adjusts the position of each writing head.

11. The assembly device as claimed in claim 10, wherein the holder moving unit includes at least three positioning pins with which the head holder is brought into contact and fixedly mounted on the holder moving unit.

12. The assembly device as claimed in claim 1, further comprising:
   a light source to output illumination light,
   wherein the illumination light output by the light source is projected along an optical axis of the imaging unit and is split by the beam splitter into two light beams, and
   one of the split beams reflects from the beam splitter to the writing head, and the other of the split beams passes through the beam splitter to the member including the reference marks.

13. A method for assembling a writing head unit, comprising:
   mounting a writing head on a head holder;
   imaging with an imaging unit the writing head mounted on the head holder by simultaneously imaging, on the same viewing field, reference marks and an alignment mark of the writing head, the reference marks indicating a reference position of the writing head and disposed in a direction different from the writing head with respect to the imaging unit;
   receiving, with a beam splitter, (i) light reflecting from the alignment mark of the writing head and (ii) light reflecting from a member including the reference mark; and
   adjusting with an adjuster relative positions of the writing head and the head holder using simultaneously imaged images of the alignment mark and the reference marks.

* * * * *